United States Patent
Beveridge

(12) 
(10) Patent No.: US 6,434,939 B1
(45) Date of Patent: Aug. 20, 2002

(54) ROTARY PISTON CHARGER

(76) Inventor: John Herbert Beveridge, P.O. Box 202, San Clemente, CA (US) 92672

(*) Notice: Subject to any disclaimer, the term of this patent is extended or adjusted under 35 U.S.C. 154(b) by 0 days.

(21) Appl. No.: 09/788,851

(22) Filed: Feb. 21, 2001

(51) Int. Cl.$^7$ ............................................... F02B 33/44
(52) U.S. Cl. .................................... 60/605.1; 123/559.1
(58) Field of Search .............................. 60/605.1, 605.2, 60/605.3; 123/559.1

(56) References Cited

U.S. PATENT DOCUMENTS

| | | | |
|---|---|---|---|
| 3,228,183 A | | 1/1966 | Feller .............................. 60/15 |
| 4,693,669 A | * | 9/1987 | Rogers, Sr. .................. 415/143 |
| 4,791,787 A | * | 12/1988 | Paul et al. .................... 60/605.1 |
| 4,843,821 A | * | 7/1989 | Paul et al. .................... 60/605.1 |
| 4,887,580 A | * | 12/1989 | Hilfiker ........................ 123/564 |
| 5,064,423 A | * | 11/1991 | Lorenz et al. ................. 60/611 |

* cited by examiner

*Primary Examiner*—Hoang Nguyen

(57) ABSTRACT

A rotary piston unit is fluid and mechanically connected to an internal combustion engine. The compressor of the rotary piston unit provides the initial compression of the air. An intercooler cools the partially compressed air prior to its introduction into the internal combustion engine. A shaft connection between the rotary piston unit and the internal combustion engine is used for power transmission and synchronization. In some configurations, the phase relationship of the shafts (pistons) is important to obtain maximum efficiency of the overall expansion process. The phase relationship of the shafts is relatively unimportant for the overall compression process because the volume of the intercooler effectively decouples the compression process of the rotary piston unit from the compression process in the internal combustion engine. Fuel is injected into the internal combustion engine and ignited in a conventional manner. After ignition, the hot, high pressure products of combustion are partially expanded by the engine thus producing shaft power. The partially expanded products of combustion are exhausted from the engine directly into the larger displacement expander of the rotary piston unit. The expansion process in the rotary piston unit provides the power for its compression process and power to the engine shaft. Since the compression and expansion processes are very efficient and the overall compression/expansion ratios are very high, the power is produced with a relatively low heat rate, i.e. low specific fuel consumption. The compression/expansion processes are done with positive displacement devices thus good performance is obtained over a large range of speeds and loads

18 Claims, 4 Drawing Sheets

ROTARY PISTON CHARGER

FIELD OF THE INVENTION

This invention relates to supercharged and intercooled internal combustion engines which utilize a rotary piston unit for first stage compression and for final stage expansion.

DESCRIPTION OF RELATED ART

Rolls-Royce Ltd.

A rotary piston unit was combined with a rotary piston engine by Rolls-Royce Ltd. This engine was designed to operate with compression ignition, i.e. a Diesel engine. To enhance the overall compression ratio and resulting air compression temperature rise, the compressed air discharged from the rotary piston unit was received directly into the rotary piston engine during its intake stroke or intake process. The phase relationship of the rotary pistons was selected to enhance the overall compression process. The volume of the interconnecting passage from the discharge port of the rotary piston unit to the intake port of the rotary piston engine was minimized. The goal was to obtain an overall compression ratio and resulting air temperature rise suitable for compression ignition (Diesel) operation. Several compound rotary piston engines of this type were built and tested during the 1960's by Rolls-Royce Ltd. of Derby, England. U.S. Pat. No. 3,228,183, dated Jan. 11, 1966, was granted to F. Feller concerning this type of compression ignition engine. Since development work was concluded, when government funding was terminated, it is probable that the test results were not encouraging.

Basic Design Differences

The design concepts of the machine disclosed herein are very different from those disclosed in the above patent granted Rolls-Royce Ltd. The invention disclosed herein is directed toward a large magnitude and very efficient overall compression/expansion ratio machine. The machine uses a rotary piston unit for initial compression and final expansion, an intercooler, and a conventional internal combustion engine. The engine may have one or multiple cylinders, may operate as a two stroke cycle or four stroke cycle, use liquid or gaseous fuel and have spark or other methods for ignition. Normally, the machine includes a compressor discharge check valve adjacent the rotary piston unit and an intercooler between the discharge check valve and the internal combustion piston engine. These two additional components essentially decouple the compression process in the rotary piston unit from the compression process in the engine and enhance the efficiency of the overall compression process. In several forms of this invention, the engine exhaust flow process is phased relative to the expansion process of the rotary piston unit to obtain the maximum expansion work available from the expanding products of combustion, thus maximizing the overall expansion efficiency. This ideal overall expansion process was not possible with the concept Rolls-Royce disclosed in their U.S. Pat. No. 3,228,183.

SUMMARY

From the above discussion it is clear that the details of the application of the rotary piston charger per this invention are very different from the prior art as patented by Rolls-Royce Ltd. In this disclosure, rotary piston units are shown in combination with various forms of internal combustion piston engines. The rotary piston unit is uniquely suited for supercharging and final expansion of non-turbocharged piston engines. When used as disclosed herein, very low specific fuel consumption machines can be obtained with reasonable size, weight and cost.

OBJECTS AND ADVANTAGES

An object of this invention is to significantly increase the magnitude and efficiency of the processes of compression/expansion, and thereby increase power output and reduce specific fuel consumption.

A second object of this invention is to increase the duration of positive torque each cycle thus improve the smoothness of operation of the machine.

A third object of this invention is to reduce the size and weight of the supercharged engine by reducing its displacement for a given power output.

A fourth object of this invention is to increase the normal speed of operation of the engine due to its reduction of size/displacement.

A fifth object of this invention is to minimize the loss of available expansion energy normally incurred when high pressure, hot exhaust gases are vented to atmospheric (exhaust) pressure.

A sixth object of this invention is to reduce the noise produced when the exhaust gases are vented to atmosphere.

A seventh object is to reduce the weight of emissions per horsepower output exhausted from the machine.

An eighth object of this invention is to reduce the temperature of the exhaust gases.

A ninth object of this invention is to use positive displacement components for the compression/expansion processes in the machine.

A tenth object of this invention is to utilize the expander of the rotary piston unit for cranking/starting the machine.

Further objects and advantages of this invention will become apparent from a consideration of the drawings and ensuing descriptions.

COMPONENTS AND FEATURES OF THIS INVENTION

The major components of this invention include a rotary piston compressor/expander unit, an intercooler, and an internal combustion piston engine. Other, lessor, but important components may include a discharge check valve adjacent the air discharge port of the rotary piston unit compressor, an admission valve adjacent the hot gas admission port of the rotary piston unit expander, a mechanical shaft drive connection between the eccentric shaft of the rotary piston unit and the crankshaft of the internal combustion engine and a secondary compression feature in the rotary piston compressor for the secondary compression of the residual or carry-over air.

Discharge Check Valve

The function of the discharge check valve, adjacent the compressed air discharge port of the rotary piston compressor, is to minimize the backflow and reexpansion of compressed air which has been pumped into the volume of the intercooler. The check valve may be pressure actuated, mechanically operated or it may a fluidic (flow operated) check valve. In some compressor designs, the function of the discharge check valve may be partially provided by rotary piston controlled discharge port(s) in the side walls of the rotary piston compressor.

Hot Gas Admission Valve

Figure 1:
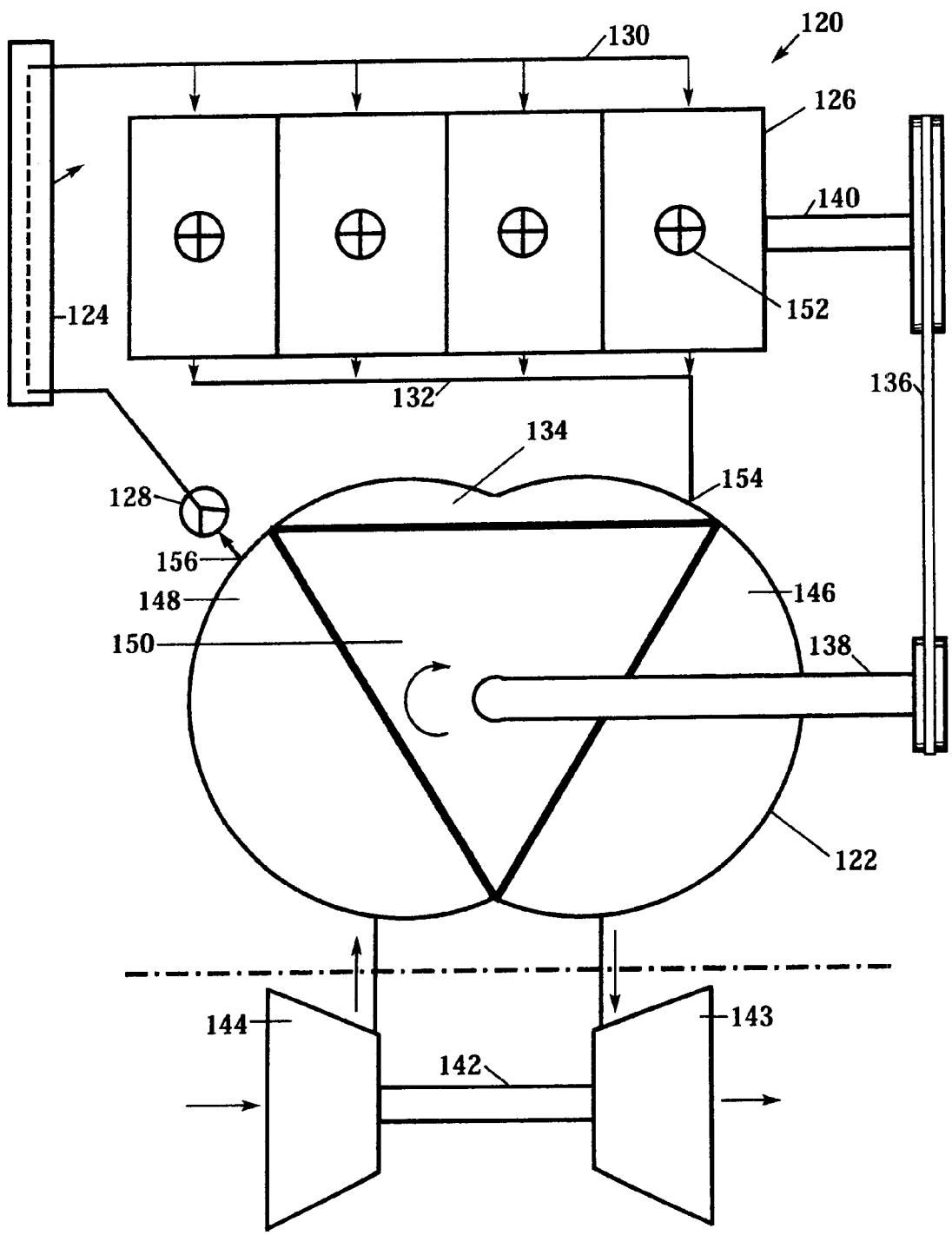
FIG. 1 is a schematic drawing of the invention showing a dual piston rotary piston unit fluid connected to a multipiston internal combustion engine via discharge check valves, an intercooler, and admission valves. A mechanical coupling connects the shafts of the rotary piston unit and the engine. A turbocharger with fluid connections to the machine is shown.

The function of the admission valves, as shown in FIG. 1, is to limit the duration of the flow of hot gases from the engine exhaust manifold into the rotary piston expanders each cycle of the expander. Limiting the duration of inflow to the expanders each cycle maintains an increased pressure in the engine exhaust manifold, thus increasing the expansion energy available to the rotary piston expander.

Mechanical Shaft Connection

Figure 2:
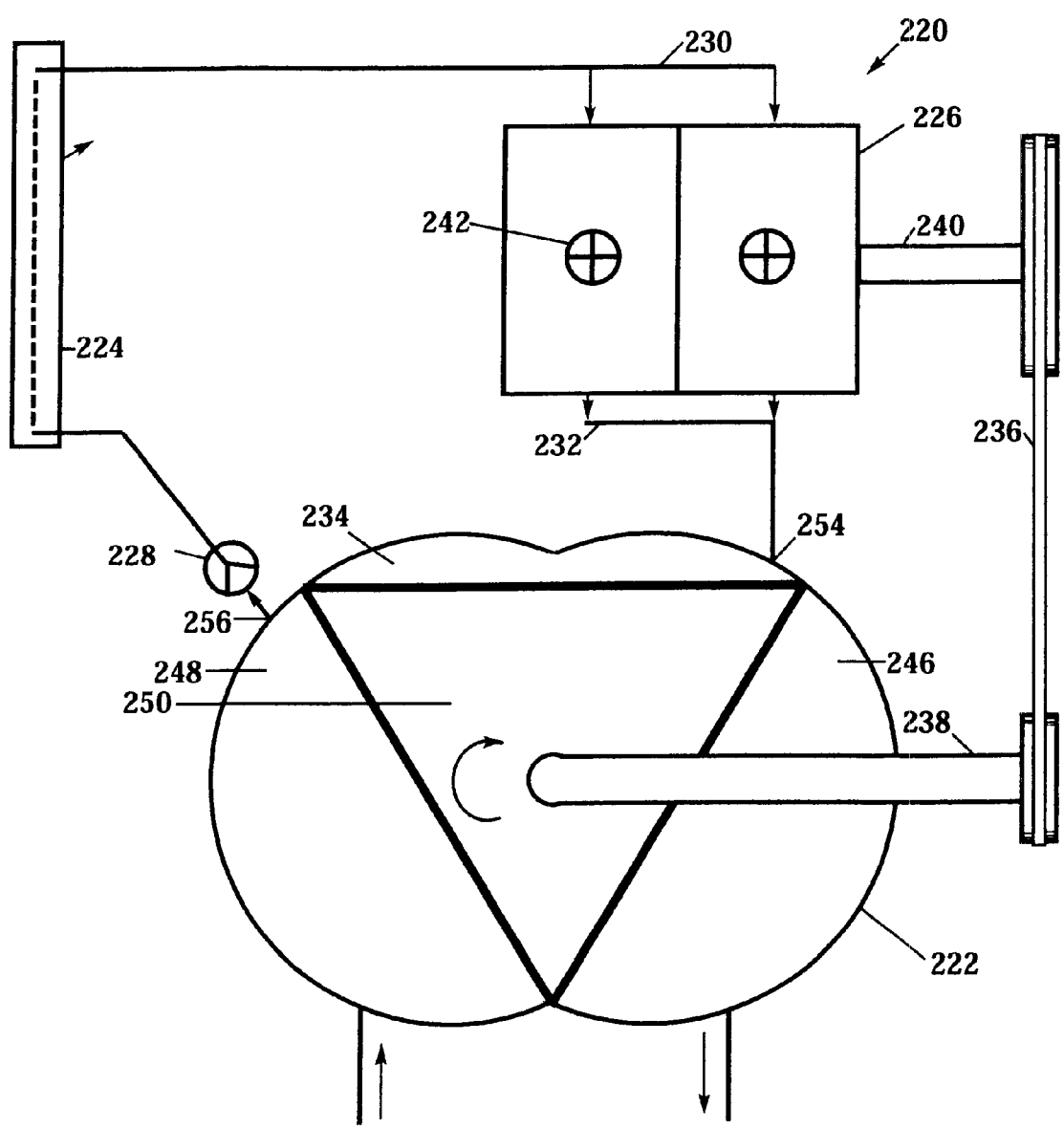
FIG. 2 is a schematic drawing of the invention showing a single piston rotary piston unit, fluid and mechanically connected to a twin cylinder, four stroke cycle, internal combustion engine. A discharge check valve and an intercooler are included between the compressor discharge port of the rotary piston unit and the intake manifold of the engine. The exhaust manifold of the engine, having a relatively small volume, is directly connected to the admission port of the rotary piston uint. (Note, no admission valve). A mechanical coupling synchronizes the phase relationship of the shafts of the rotary piston unit and the engine.
Figure 3:
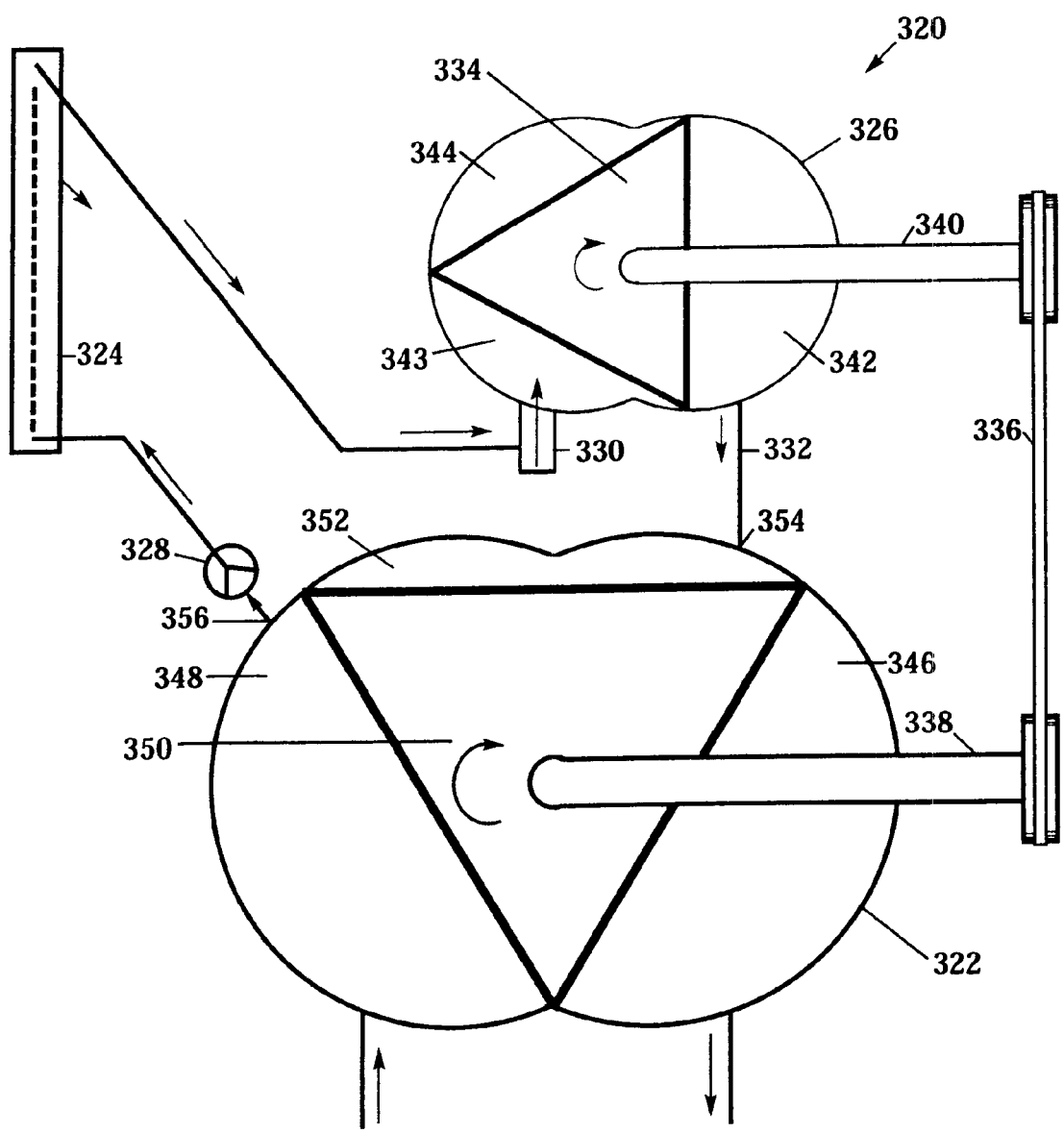
FIG. 3 is a schematic drawing of the invention showing a single piston rotary piston unit with fluid and mechanical connections to a single piston rotary piston engine. A discharge check valve and an intercooler are provided in the compressor discharge fluid connection between the rotary piston unit and the intake port of the rotary piston engine. The exhaust manifold, connecting the exhaust port of the rotary piston engine to the admission port of the rotary piston expander, has a relatively small volume. A mechanical coupling synchronizes the phase relationship of the shafts of the rotary piston unit and the rotary piston engine.
Figure 4:
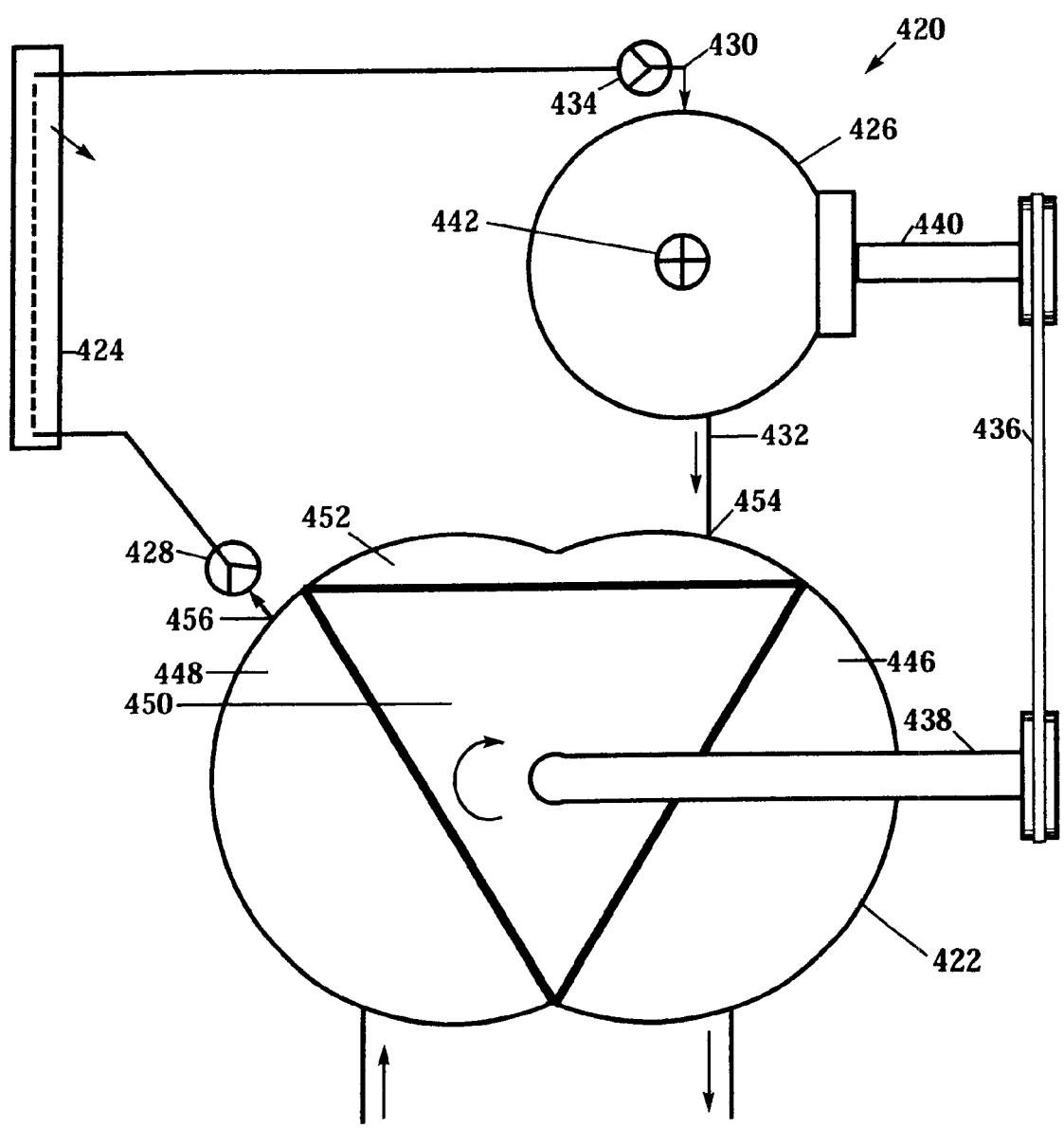
FIG. 4 is a schematic drawing of the invention showing a single piston rotary piston unit with fluid and mechanical shaft connections to a single cylinder two stroke reciprocating piston engine. A discharge check valve and an intercooler are included in the discharge fluid connection between the rotary piston unit and the two stroke engine. The engine exhaust manifold, connecting the engine exhaust to the admission port of the expander of the rotary piston unit, has a relatively small volume. A mechanical connection of the shafts of the rotary piston unit and the engine maintains the phase relationship of their pistons.

In some applications, FIGS. 2, 3, and 4, the shaft connection synchronizes the motion of the pistons and provides power transmission between the rotary piston unit and the engine. Other applications, FIG. 1, may have a shaft connection for power transmission, however, the rotary piston unit may turn at a different speed relative to the engine. Most of the power generated by the expander of the rotary piston unit is consumed by its compressor. Thus, no mechanical shaft connection is necessary for machine operation and other methods of speed control of the rotary piston unit, such as a by-pass hot gas valve (not shown), are feasible.

Secondary Compression of Carry-Over Air

An inherent feature of the rotary piston unit is that the minimum clearance volume at the end of the compression process and the start of the expansion process is about five percent of its displacement. To minimize sudden expansion (blowdown) available energy losses, its is desirable to have the initial pressure in the rotary piston clearance volume approximately equal to the engine exhaust manifold pressure or engine cylinder gas release pressure. This can be done by terminating the discharge flow to the intercooler prior to the piston of the rotary piston compressor reaching its minimum clearance volume, thus, continuing the compression process (secondary compression) on the residual or carryover air.

Rotary Piston Unit

The rotary piston unit may have one or more pistons. Each rotary piston completes four "strokes" or processes, i.e. intake, compression, expansion and exhaust each turn of the eccentric shaft. The rotary piston has a triangular shape, i.e., three essentially identical faces or piston surfaces (without combustion chamber volumes). Thus, the rotary piston continuously forms three working chambers. With each clockwise turn of the eccentric shaft, the rotary piston rotates clockwise one-third turn, thus completing a cycle. Each "stroke" or process requires 270 degrees (ideal) of eccentric shaft rotation.

The housing surrounding the rotary piston has two lobes. One lobe is the intake/compression volume and the other lobe is the expansion/exhaust volume. There are two minimum volumes or clearance volumes formed each cycle. One minimum volume occurs as a piston face crosses from the intake/compression lobe to the expansion/exhaust lobe and the other minimum volume occurs when a piston face crosses from the expansion/exhaust lobe to the intake/compression lobe. At one minimum volume, the end of compression volume is in communication with the start of expansion volume. At the other minimum volume, the end of exhaust volume is in communication with the start of intake volume.

The relatively long ideal expansion process of a single piston rotary piston unit (270 degrees) combined with the ideal expansion process (180 degrees) of a single cylinder two stroke or twin cylinder four stroke engine provides continuous expansion work. As a result, the power output is relatively smooth for a simple machine.

In this invention, the displacement of the rotary piston unit is normally many times the displacement of the internal combustion engine. Thus, the lower pressure, larger volume portion of the thermodynamic cycle is done in the rotary piston unit and the higher pressure, smaller volume portion of the thermodynamic cycle is done in the engine.

Starter

The expander volume of the rotary piston unit may be provided with a source of pressurized air for starting the entire machine.

Intercooler

An intercooler cools the partially compressed air discharged from the rotary piston compressor. The internal volume of the intercooler acts as a reservoir which decouples the intermittent outflow from the compressor relative to the inflow to the internal combustion engine. The reduction of the temperature of the partially compressed air in the intercooler further increases its density thus a reduction in the displacement of the engine occurs. In many machines, the increased density or reduced volume flow due to the intercooler approaches a factor of about two. This second reduction of volume flow and corresponding reduction of engine displacement is sufficient to allow an increased engine speed, hence a further reduction of engine size/displacement.

Also, the reduced inlet air temperature reduces the engine work of compression, thus, an increase in engine power output and a reduced specific fuel consumption occurs. A reduction in inlet air temperature is very important for spark ignition engines to reduce the possibility for combustion "knock" and the formation of oxides of nitrogen in the products of combustion.

Internal Combustion Engine

The internal combustion engines of this invention are relatively conventional engines designed and built to operate with high working pressure and high heat release per unit displacement volume. They may be two stroke cycle or four stroke cycle. Compression ignition, spark ignition or other methods for ignition may be used. The piston(s) may reciprocate or rotate. It is desirable to use fuel injection downstream of the intercooler to avoid puddling of liquid fuel. Gaseous fuels may be used also.

Turbocharger

A turbocharger may be used with the machines disclosed herein. In this case, the compressor of the turbocharger is the first stage compressor. It discharges into the inlet of the compressor of the rotary piston unit, as shown in FIG. 1. An intercooler between the compressor stages (not shown in FIG. 1) is optional. The turbine of the turbocharger is the final stage of expansion. A turbocharger may be used with a single piston rotary piston unit due to the long duration and overlapping of the exhaust stroke(s). An advantage of the exhaust turbine is that the exhaust gases from the rotary piston expander are expanded down to atmospheric pressure prior to there release. This reduces the noise and temperature of the exhaust gases emitted from the machine.

Normally, the turbocharger has fluid connections to the machine only. Turbocharger speed is often controlled with a hot gas bypass valve at the turbine. Matching of a turbocharger to the positive displacement components of the machine is aided by the use of an intercooler downstream from the compressor of the turbocharger. Matching of the positive displacement components of the machine is not a problem.

LIST OF REFERENCE NUMERALS

FIG. 1

| | |
|---|---|
| 120 | machine with multipiston engine |
| 122 | rotary piston unit |
| 124 | intercooler |
| 126 | multiple-piston internal combustion engine |
| 128 | discharge check valve |
| 130 | intake manifold, engine |
| 132 | exhaust manifold, engine |
| 134 | admission valve |
| 136 | mechanical shaft connection |
| 138 | eccentric shaft, rotary piston unit |
| 140 | crankshaft, engine |
| 142 | turbocharger |
| 143 | turbine of turbocharger |
| 144 | compressor of turbocharger |
| 146 | expander, expander volume, rotary piston unit |
| 148 | compressor, compressor volume, rotary piston unit |
| 150 | piston, rotary piston unit |
| 152 | fuel injector, diesel |

FIG. 2

| | |
|---|---|
| 220 | machine with 4 stroke twin cyl. engine |
| 222 | rotary piston unit |
| 224 | intercooler |
| 226 | twin cylinder, four stroke engine |
| 228 | discharge check valve |
| 230 | intake manifold, engine |
| 232 | exhaust manifold, engine |
| 234 | blank |
| 236 | mechanical shaft connection |
| 238 | eccentric shaft, rotary piston unit |
| 240 | crankshaft, engine |

-continued

LIST OF REFERENCE NUMERALS

| | |
|---|---|
| 242 | blank |
| 243 | blank |
| 244 | blank |
| 246 | expander, expander vol., rotary piston unit |
| 248 | compressor, compr. vol., rotary piston unit |
| 250 | piston, rotary piston unit |
| 252 | blank |

FIG. 3

| | |
|---|---|
| 320 | machine with rotary piston engine |
| 322 | rotary piston unit |
| 324 | intercooler |
| 326 | rotary piston internal combustion engine |
| 328 | discharge check valve |
| 330 | intake manifold |
| 332 | engine exhaust manifold |
| 334 | piston, rotary piston engine |
| 336 | mechanical shaft coupling |
| 338 | eccentric shaft, rotary piston unit |
| 340 | eccentric shaft, rotary piston engine |
| 342 | expander, expander volume, rotary piston engine |
| 344 | compressor, compressor volume, rotary piston eng |
| 346 | expander, expander volume, rotary piston unit |
| 348 | compressor, compressor volume, rotary piston unit |
| 350 | piston, rotary piston unit |

FIG. 4

| | |
|---|---|
| 420 | machine with two stroke engine |
| 422 | rotary piston unit |
| 424 | intercooler |
| 426 | two stroke, single cylinder engine |
| 428 | discharge check valve |
| 430 | inlet manifold |
| 432 | engine exhaust manifold |
| 434 | check valve, engine inlet manifold |
| 436 | mechanical shaft coupling |
| 438 | eccentric shaft, rotary piston unit |
| 440 | crankshaft, engine |
| 442 | spark plug |
| 444 | blank |
| 446 | expander, expander volume rotary pist. unit |
| 448 | compressor, compr. vol., rotary piston unit |
| 450 | piston, rotary piston unit |

DESCRIPTION OF THE INVENTION

First Embodiment

The complete engine system or machine 120 is shown schematically in FIG. 1. The three major components include a dual piston rotary piston unit 122, an intercooler 124, and an internal combustion engine 126. Lessor components include dual discharge check valves 128, the engine intake manifold 130, the engine exhaust manifold 132, dual hot gas admission valves 134 and a mechanical shaft coupling device 136 connecting the eccentric shaft 138 of the rotary piston unit to the crankshaft 140 of the engine. Turbocharger 142, a non-essential component, is shown for completeness. For discussion purposes, assume rotary piston unit 122 is a dual rotary piston unit with two discharge check valves 128 and two admission valves 134. Engine 120 is a four cylinder, four stroke cycle diesel. Mechanical drive connection 136 causes eccentric shaft 138 of rotary piston unit 122 to complete about two turns for each turn of crankshaft 140 of engine 126. The design of the engine must take into account the increased pressure effects of supercharging. Thus, the structural and thermal loading are a major design consideration in the design of engine 126.

The turbocharger 142, a non-essential component of conventional design, is fluid connected only. A second intercooler, not shown in FIG. 1, may be included downstream of the turbocharger compressor 144. Exhaust gas driven turbine 143 drives compressor 144.

Operation

The machine 120 is configured to provide a very high overall compression ratio with near ambient temperature inlet air flow into engine 126. The overall expansion ratio is very high also. The goal is to obtain very low specific fuel consumption using mostly available hardware. The fluid flows into and out of the major components is relatively steady. The pressure in intercooler 124 and the engine intake manifold 130 is significantly lower than the pressure in the engine exhaust manifold 132 due to the operation of the admission valves 134. The higher pressure in the engine exhaust manifold 132 is to maximize the expansion energy available to the rotary piston expansion process. The admission valves 134 control the pressure in the engine exhaust manifold 132 by adjusting the duration of the flow of hot gases to the volumes of rotary piston expanders 146. It is desirable to regulate the pressure in the engine exhaust manifold 132 to approximately equal the pressure in the engine cylinders when the engine exhaust valves open.

The design of the discharge porting of the compressors 148 of the rotary piston units is tailored to approximately match the end of compression pressure with initial pressure in the volumes of expanders 146. The volumes of compressors 148 of the rotary piston units conclude their process of compressing and discharging air prior to the rotary pistons 150 reaching minimum clearance volume. A secondary compression process continues the compression of the remainder or carryover air thus raising its pressure to approximate the pressure of the initial hot gas inflow to the expansion volumes 146 of the rotary piston units. Thus, the total pressure at the start of the secondary expansion process in the expansion volume of the rotary piston units is maximized.

The output torque of engine 126 is generally positive except at top center and bottom center where the output torque is zero. Fuel injected 152 diesel engine 126 output torque is negative late in the compression stroke of each piston, hence four times each two turns of the engine crankshaft 140. Since the dual rotary pistons 150 of the rotary piston units have about a 180 degree phase relationship, the torque output of the two expander volumes 146 of the rotary piston units is continuously positively and overlapping. For this reason the torque output of the overall machine 120 is very smooth. When supplied from a source of pressurized air (not shown in FIG. 1), expanders 146 may function as a pneumatic starter.

Second Embodiment

The complete engine system or machine 220 is shown schematically in FIG. 2. The three major components include a rotary piston unit 222, an intercooler 224, and an internal combustion engine 226. Lessor components include a discharge check valve 228, the engine intake manifold 230, the engine exhaust manifold 232 and a mechanical shaft coupling device 236 connecting eccentric shaft 238 of rotary piston unit to the crankshaft 240 of the engine. For discussion purposes, assume the rotary piston unit 222 has a single rotary piston and a discharge check valve 228. Note, machine 220 does not require an admission valve. Also for discussion purposes, engine 226 is a two cylinder, four stroke cycle, alternate firing, spark ignition, gasoline engine. The design of the engine 226 must take into account the effects of supercharging. Thus, the structural and thermal loading are a major design consideration.

Operation

Machine 220 is configured to provide a very high overall compression ratio with near ambient temperature inlet air flow into engine 226. The overall expansion ratio is very high also. The goal is to obtain very low specific fuel consumption. The pressure in intercooler 224 and engine intake manifold 230 is approximately constant over a complete cycle of two turns of crankshaft 240. Each cylinder exhaust alternately flows into a common engine exhaust manifold 232 having a small volume. Piston 244 of the rotary piston unit is phased to start its expansion stroke or process as exhaust gases are released from an engine cylinder. Thus, as an engine cylinder exhaust flow process proceeds, the products of combustion continue their expansion in the larger displacement expander volume 246 of the rotary piston unit 222. The duration of the engine exhaust flow process is normally somewhat greater than the ideal value of 180 degrees of crankshaft rotation for each cylinder on alternate turns. The duration of the ideal expansion process for the rotary piston unit expander is 270 degrees of eccentric shaft rotation. Crankshaft 240 and eccentric shaft 238 rotations are synchronized, hence a continuous and efficient total expansion process is realized.

In some applications, the rotary piston expansion process is terminated early such that the pressure in the expander 246, engine exhaust manifold 232 and engine cylinder combustion chambers (not shown) are caused to drop to atmospheric pressure at the end of the engine exhaust stroke. This reduction of pressure reduces the weight and temperature of the residual products of combustion in the engine combustion chamber, thus reducing the contamination and heating of the next fresh charge. A reduction of temperature in the next fresh charge results in a reduced temperature at the end of compression and a reduced peak combustion temperature. The latter is important for the control of oxides of nitrogen emissions.

The design of compressor 248 of rotary piston unit 222 is tailored to approximately match the initial pressure in the volume of expander 246. Compression in volume 248 of the rotary piston unit concludes the process of compressing and discharging air prior to rotary piston 250 of rotary piston unit 222 reaching its minimum clearance volume. A secondary compression process continues the compression of the remainder or carry-over air, thus raising its pressure to approximately equal the pressure of the initial hot gas inflow to the volume of expansion 246. Hence, the loss in total pressure at the start of secondary expansion process is minimized.

Third Embodiment

The complete engine system or machine 320 is shown schematically in FIG. 3. The three major components include a rotary piston unit 322, an intercooler 324, and a rotary piston internal combustion engine 326. Lessor components include a discharge check valve 328, the engine intake manifold 330, the engine exhaust manifold 332 and a mechanical shaft coupling device 336 connecting the eccentric shaft 338 of the rotary piston unit 322 to the eccentric shaft 340 of rotary piston engine 326. For discussion purposes, assume rotary piston unit 322 is a single rotary piston unit with discharge valve 328. Note, machine 320 does not require an admission valve. Rotary piston engine 326 has a single rotary piston 334, spark ignition and gasoline for fuel. The mechanical drive connection 336 causes eccentric shaft 338 of the rotary piston unit and eccentric shaft 340 of the rotary piston engine to turn in synchronization and with a fixed phase relationship.

Operation

Machine 320 is configured to provide a very high overall compression ratio with near ambient temperature inlet air flow into engine 326. The overall expansion ratio is very high also. The goal is to obtain very low specific fuel consumption.

Intake air is initially compressed and discharged via check valve 328 from compressor 348 of rotary piston unit 322. The pressure in intercooler 324 and engine intake manifold 330 are approximately constant over a complete cycle, i.e. one turn of eccentric shafts 338 and 340. Partially compressed and cooled air enters compressor 344 of rotary piston engine 326, along with injected fuel, where final compression occurs. As rotary piston 334 in rotary piston engine 326 approaches minimum volume, the compressed air plus fuel mixture is ignited and hot, high pressure products of combustion are formed. Initial expansion of these products of combustion occurs in the expander lobe or volume 342 of rotary piston engine 326. Rotary piston 350 of rotary piston unit 322 is phased to start its expansion stroke or process as the partially expanded products of combustion are released from rotary piston engine 326. Thus, as the rotary piston engine exhaust flow process proceeds, the products of combustion are finally expanded in the larger displacement expander 346 of rotary piston unit 322. The duration of the rotary piston engine exhaust flow process is the same as the duration of the final expansion process of the expander of the rotary piston unit. Eccentric shafts 338 and 340 have a predetermined phase angle and a 1:1 speed ratio.

In some applications, the final expansion process is terminated early such that the pressure in the rotary piston unit expander 346, exhaust manifold 332 and rotary piston engine expander 342 are caused to drop to atmospheric pressure at the end of the rotary piston engine exhaust stroke. This reduction of pressure reduces the weight and temperature of the residual products of combustion in the combustion chamber and clearance volume, thus reducing the contamination and heating of the next fresh charge of intake air.

The design of compressor 348 of rotary piston unit 322 provides secondary compression of the carry-over air. This secondary compression is to approximately match the pressure of the carry-over air to the initial release pressure of the partially expanded products of combustion at the start of rotary piston engine 326 exhaust process. To accommodate the secondary compression process, rotary piston 350 of rotary piston unit 322 concludes the process of compressing and discharging air prior to reaching its minimum clearance volume. The secondary compression process continues the compression of the remainder or carryover air, thus raising its pressure to approximately equal the pressure of the initial hot gas inflow to expander 346 of rotary piston unit 322. Thus, the loss in total pressure at the start of secondary expansion process is minimized.

Fourth Embodiment

The complete engine system or machine 420 is shown schematically in FIG. 4. The three major components include a rotary piston unit 422, an intercooler 424, and an internal combustion engine 426. Lessor components include a discharge check valve 428, the engine intake manifold 430, the engine exhaust manifold 432 and a mechanical shaft coupling device 436 connecting eccentric shaft 438 of the rotary piston unit 422 to crankshaft 440 of engine 426. For discussion purposes, assume rotary piston unit 422 has a single rotary piston 450 and discharge check valve 428. Note, machine 420 does not require an admission valve. Also, assume that engine 426 is a single cylinder, two stroke cycle, spark ignition, fuel injected, gasoline engine. Mechanical drive connection 436 causes eccentric shaft 438 of rotary piston unit 422 and crankshaft 440 of engine 426 to turn with a predetermined phase relationship. Two stroke engine 426 has a spark plug 442 and an optional check valve 434 in inlet manifold 430.

Operation

Machine 420 is configured to provide a very high overall compression ratio with near ambient temperate inlet scavenge air to engine 426. The overall expansion ratio is very high also. The primary goal is to obtain very low specific fuel consumption.

The simple piston ported two stroke engine 426 is greatly improved with the addition of rotary piston unit 422 and intercooler 424. Compressor 448 of rotary piston unit 422 performs the scavenge air compressor function and supercharges engine 426. Expander 446 of rotary piston unit 422 provides the power needed to drive its compressor 448 and the back pressure on engine 426 required for supercharging Excess power generated by rotary piston unit 422 is transmitted from eccentric shaft 438 via shaft coupling 436 to crankshaft 440 of engine 426. The inherent design of rotary piston unit compressor 448 causes a continues, almost steady, inflow of air. Air is compressed and discharged as a pulsed flow via a discharge check valve 428 into intercooler 424. Due to its relatively large volume, the pressure in intercooler 424 is approximately constant over a complete cycle, i.e., one turn of eccentric shaft 438 or crankshaft 440. Partially compressed and cooled air enters engine 426 during the cylinder scavenging process.

Prior to the cylinder scavenging process, fresh air plus fuel is ignited by spark plug 442 and burned when the piston of engine 426 is at/near top center. The hot, high pressure products of combustion are partially expanded during the downstroke of the engine piston in its cylinder. The engine piston opens the cylinder exhaust port allowing the initial cylinder outflow of products of combustion into the engine exhaust manifold 432. Next, the engine piston opens the cylinder inlet port(s) thus communicating the volume of the cylinder to the volume of intercooler 424. If the pressure of the partially expanded products of combustion in the volume of the cylinder is greater than the pressure in intercooler 424, check valve 434 prevents a significant backflow until the cylinder pressure decays.

Piston 450 of rotary piston unit 422 is phased to start its expansion stroke or process as exhaust flow is released from engine 426. The continuously increasing volume of expander 446 of rotary piston unit 422 provides space for the outflow of gases from engine 426. When the pressure in the cylinder of engine 426 decreases to the pressure in intercooler 424, scavenge air flow commences. Thus, engine 426 is scavenged with cooled, partially compressed air and the engine cylinder outflow is limited by the rate of increase in volume of rotary piston 450 of rotary piston unit 422. Hence, the cylinder of engine 426 is supercharged to approximately the pressure in intercooler 424.

On the upstroke of the engine piston, the cylinder ports are closed and the final compression stroke commences. Normally, fuel is injecteded into the engine 426 during the compression stroke.

The duration of engine exhaust flow is less than the duration of the expansion process of rotary piston unit 422. Thus, the expansion process of rotary piston 450 continues in the normal way after cylinder exhaust port closure.

Conclusion

A machine comprising a rotary piston unit, an intercooler, and an internal combustion engine connected as disclosed herein is the key design concept for a significant near term improvement to achieve important reductions in piston engine file consumption, size, weight and cost. Although the invention is described with respect to preferred embodiments, modifications thereto will be apparent to those skilled in the art. Therefore, the scope of the invention is to be determined by reference to the claims that follow:

What is claimed is:

1. A machine for generating shaft power comprising:
   a rotary piston unit,
   said rotary piston unit comprising a compressor and an expander,
   said rotary piston compressor having primary and secondary compression chambers, said second compression chamber further compressing the carry-over air from the primary chamber
   said primary compression chamber having a discharge port and a discharge check valve,
   and a four stroke cycle internal combustion engine with one or more pistons,
   said internal combustion engine in fluid connection with said primary compression chamber and said expander,
   an intercooler in said fluid connection downstream from said discharge check valve,
   whereby said internal combustion engine is supercharged with cooled air and said rotary piston unit provides the initial compression process and final expansion process.

2. As in claim 1 wherein said internal combustion engine has a fuel injection system.

3. As in claim 1 wherein said four stroke cycle internal combustion engine is a reciprocating piston engine.

4. As in claim 1 wherein said four stroke cycle internal combustion engine is a rotary piston engine.

5. As in claim 1 wherein said four stroke cycle internal combustion engine is a reciprocating piston engine, the speed ratio of said rotary piston unit to said engine is equal to the number of cylinders divided by two.

6. As in claim 1 wherein said four stroke cycle internal combustion engine is a rotary piston engine, the speed ratio of said rotary piston unit to said rotary piston engine is one.

7. As in claim 1 wherein said internal combustion engine has a reduced weight of residual exhaust gases due to the venting of said engine at the end of its exhaust process via an open exhaust port and an open admission port of said rotary piston unit.

8. As in claim 1 wherein said internal combustion engine is a spark ignition engine.

9. As in claim 1 wherein said internal combustion engine is a compression ignition engine.

10. As in claim 1 wherein said rotary piston unit has a phase relationship relative to said engine such that the start of the expansion process of said rotary piston unit occurs about when an engine exhaust process commences.

11. As in claim 1 wherein the volume of said fluid connection between said discharge check valve of said rotary piston unit and said internal combustion engine decouples the pulsed discharge flow from said primary compression chamber relative to the intake flow to said internal combustion engine.

12. As in claim 1 wherein said rotary piston unit has a predetermined displacement relative to the displacement of said internal combustion engine.

13. As in claim 1 wherein said internal combustion engine has a minimum volume exhaust connection to said expander of said rotary piston unit.

14. A machine for generating shaft power comprising:
    a rotary piston unit,
    said rotary piston unit comprising a compressor and an expander,
    said rotary piston compressor having primary and secondary compression chambers, said second compression chamber further compressing the carry-over air from the primary chamber
    said primary compression chamber having a discharge port and a discharge check valve,
    and a two stroke cycle internal combustion engine with one or more cylinders,
    said two stroke internal colon engine having fluid connections to said primary compression chamber and said expander,
    an intercooler downstream from said discharge check valve,
    said rotary piston unit having an eccentric shaft,
    said two stroke engine having a crankshaft,
    said shafts being mechanically connected with a predetermined speed ratio and a predetermined phase relationship,
    said shaft speed ratio of said eccentric shaft to said crankshaft being equal to the number of cylinders,
    said shaft phase relationship causing the start of each cylinder exhaust/scavenge process to correspond approximately to the start of each expansion process of said rotary piston unit,
    whereby the rate of outflow of products of combustion from said cylinder of said two stroke internal combustion engine is controlled by the rate of increase in volume of said expander and said cylinder is scavenged by the partially compressed and cooled fluid contained in said fluid connection between said discharge check valve and said internal combustion engine.

15. As in claim 14 wherein the volume of said fluid connection between said discharge check valve of said rotary piston unit and said internal combustion engine decouples the pulsed discharge flow from said primary compression chamber relative to the scavenge flow to said internal combustion engine.

16. As in claim 14 wherein said internal combustion engine has a minimum volume exhaust connection to said expander of said rotary piston unit.

17. A method for generating shaft power from a machine having very low specific fuel consumption comprising:
    using the compressor of a rotary piston unit for the initial partial compression and discharge of air from a primary chamber of said compressor,
    intercooling the partially compressed air flowing from said primary chamber of said compressor,
    adding fuel to said partially compressed air,
    intaking said air plus fuel into an internal combustion engine,
    compressing said air plus fuel in said internal combustion engine,
    igniting and burning said air plus fuel forming hot, high pressure products of combustion,
    partially expanding said hot products of combustion in said internal combustion engine,
    performing secondary compression of carry-over air,
    exhausting said partially expanded products of combustion from said internal combustion engine into said secondary compressed air,
    expanding said partially expanded products of combustion in said expander of said rotary piston unit,
    exhausting said products of combustion from said expander of said rotary piston unit, whereby said internal combustion engine is supercharged with cooled air and said rotary piston unit provides the initial compression and final expansion processes.

18. As in claim 17 wherein said machine includes a turbocharger, using the compressor of said turbocharger for the initial partial compression of air, using the compressor of a rotary piston unit for additional partial compression of air, intercooling the partially compressed air flowing from said rotary piston compressor, adding fuel to said partially compressed air, intaking said air plus fuel into an internal combustion engine, compressing said air plus fuel in said internal combustion engine, igniting and burning said air plus fuel forming hot, high pressure products of combustion, partially expanding said hot products of combustion in said internal combustion engine, exhausting said partially expanded products of combustion from said internal combustion engine, expanding said partially expanded products of combustion in said expander of said rotary piston unit, exhausting said products of combustion from said expander of said rotary piston unit, expanding and exhausting said products of combustion from said expander of said rotary piston unit to said turbine of said turbocharger, whereby said internal combustion engine is supercharged with cooled air and said turbocharger provides the initial compression and final expansion processes.

\* \* \* \* \*